April 21, 1925.  1,534,856

E. A. McKOY ET AL

APPARATUS FOR SEVERING STUMPS

Original Filed May 23, 1921   3 Sheets-Sheet 1

Inventors
Edwin A. McKoy and
George D. Moore
By
Attorney

April 21, 1925.                                                1,534,856
              E. A. McKOY ET AL
           APPARATUS FOR SEVERING STUMPS
           Original Filed May 23, 1921    3 Sheets-Sheet 2
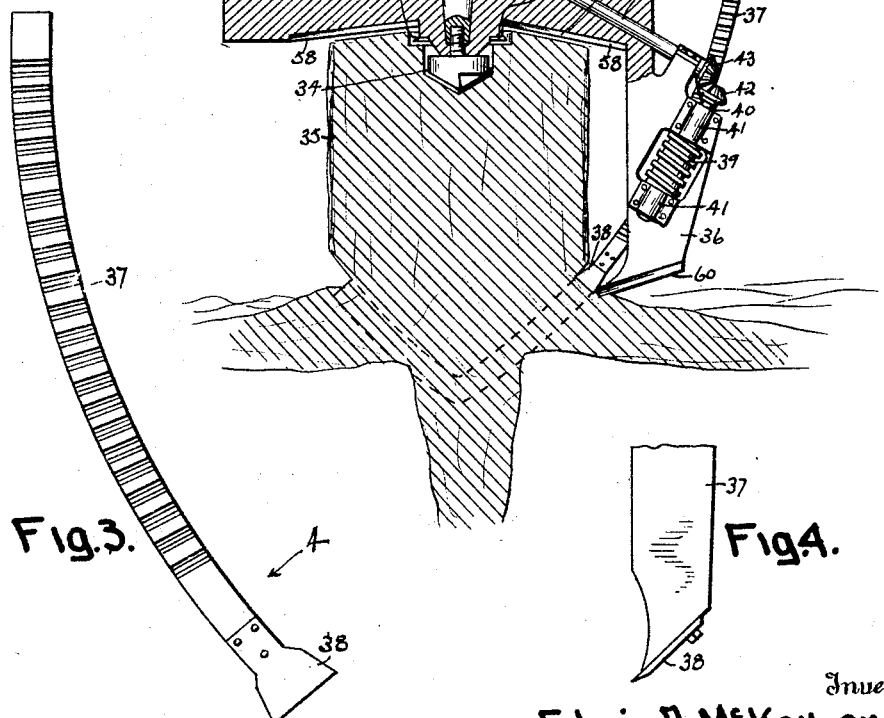
Inventors
Edwin A. McKoy and
George D. Moore
By  L.L. Morrill
                    Attorney April 21, 1925.

E. A. McKOY ET AL 1,534,856

APPARATUS FOR SEVERING STUMPS

Original Filed May 23, 1921    3 Sheets-Sheet 3

Inventors
Edwin A. McKoy and
George D. Moore
By *L. L. Morrill*
Attorney

Patented Apr. 21, 1925.

1,534,856

UNITED STATES PATENT OFFICE.

EDWIN A. McKOY AND GEORGE D. MOORE, OF NEW ORLEANS, LOUISIANA.

APPARATUS FOR SEVERING STUMPS.

Application filed May 23, 1921, Serial No. 471,623. Renewed September 30, 1924.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Apparatus for Severing Stumps, of which the following is a specification.

This invention relates to stump cutters and has for an object to provide a device with improved means for cutting a stump at, or adjacent to, or below the ground line, whereby the body of the stump may be lifted out for further processing and the several roots, separated thereby, individually removed from the ground for similar or other treatment.

A further object of the present invention is to cut out, for conservation, standing stumps of turpentine trees, from which stumps, upon further processing, turpentine, rosin, pine oil and other ingredients may be removed by distillation, or otherwise, and the residue employed as may be found convenient.

A further object of the invention is to provide a dirigible power plant, preferably of the caterpillar type, although the present invention is not limited to the structural features of the power plant, upon which is mounted a vertical spindle, carrying means rotating with the spindle and driven from the power plant, for cutting a circular groove into the body of the stump, upon a conoidal projection and by continuing the cut toward the center, to finally sever the stump body from its roots.

A further object of the invention is to provide a cutter head, carrying a cutter, or cutters, with improved means for feeding the cutter, or cutters, toward the axis of rotation of the head extended.

A further object of the invention is to provide a rotating cutter head, having cutting knives carried thereby, and inclined toward each other, with means for advancing the knives, as the cutter head rotates, whereby a conoidal cut is made in the body of the stump, with the apex of the conoid extending downwardly into the complementary depression cut in the remaining portions of the stump and roots.

With these and other objects in view, the invention comprises certain novel units, elements, parts, constructions, arrangements and combinations of parts, as will be hereinafter more fully described and claimed.

In the drawings, Fig. 1 is a perspective view of the improved stump cutter, showing a fragment of a conventional dirigible power plant.

Fig. 2 is a view, in front elevation, of the cutter head shown in section and the means for rotating the same.

Fig. 3 is a view, in elevation, of one of the knife arms.

Fig. 4 is a view, in elevation, of the lower end of one of the knife arms, shown at right angles to the view at Fig. 3 as indicated by the arrow 4 at Fig. 3.

Like characters of reference indicate corresponding parts throughout the several views.

Figure 1:
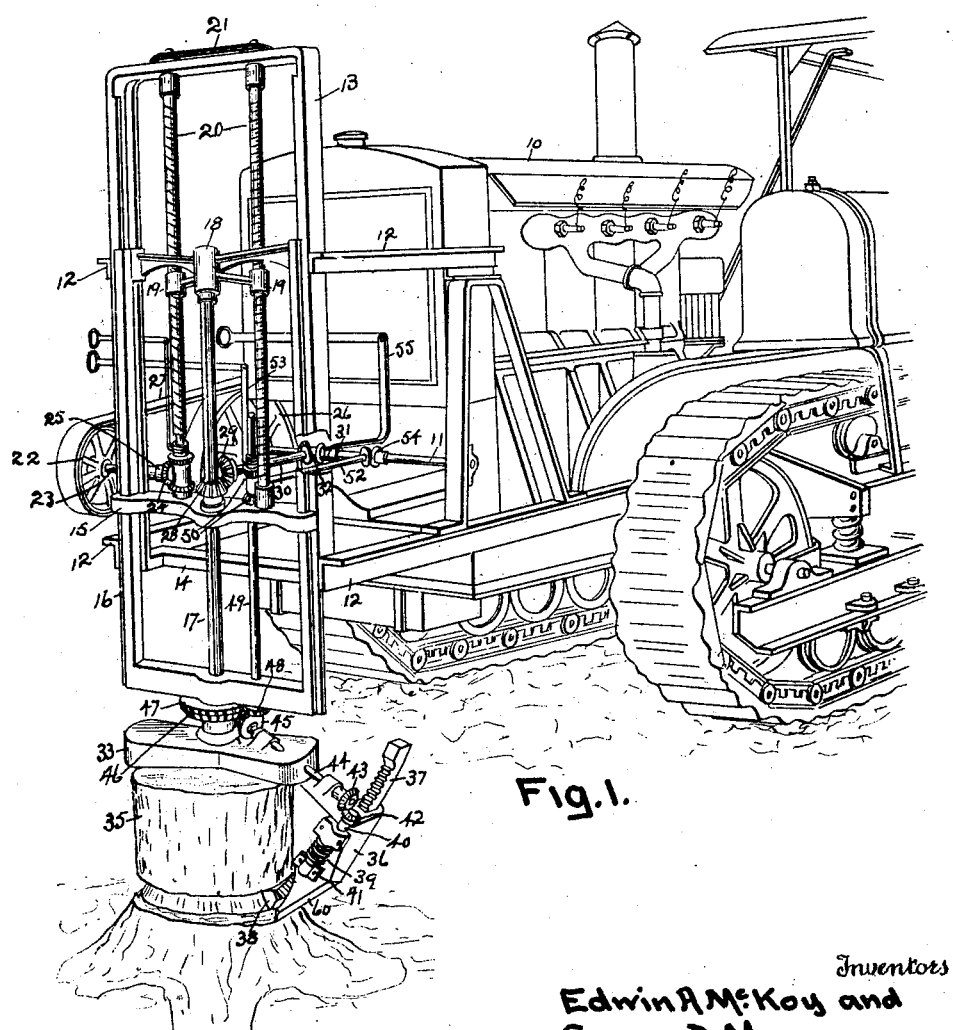

The improved stump cutter, which forms the subject matter of this application, is mounted and carried upon any approved type of dirigible power plant, such a power plant being indicated conventionally at 10, of the caterpillar type, it being understood that the type or structure of the power plant does not enter into the present invention. The power plant, of whatever type, carries a power shaft 11 from which power is transmitted to the various instrumentalities carried upon said power plant in any appropriate manner, as by means of arms 12.

The cutting device proper comprises a vertical frame 13 carried rigidly upon the arms 12 with rigid crossbars 14 and 15. Slidable within the frame 13 is an auxiliary frame 16 having journaled along its major axis a normally vertical spindle 17. The spindle 17 has its upper end journaled in a thrust bearing 18 in a spider, two legs of which are rigidly connected with the sliding auxiliary frame 16 and two legs of which are provided with threaded sleeves 19 engaging upon vertical, parallel worms 20. The worms 20 are journaled in the rigid frame 13 and cross bar 15 and are geared to rotate in unison in any approved manner as by means of a sprocket chain 21 passing over sprockets upon the upper ends of such worms. The worms are driven by means of a pulley 22 upon a shaft 23 with gears 24 transmitting motion from such shaft to one of the worms 20 and with a reversing clutch mechanism 25 not shown in detail but of any usual and ordinary type whereby the worms may be driven in either direction. The pulley 22 is driven from a pulley 26, which latter pulley is carried by the power shaft 11, through the medium of the belt 27.

It is obvious, therefore, that as the worms 20 are driven, in either direction, the auxiliary frame is moved upwardly, or downwardly, according to the direction of drive. The spindle 17 is provided with a gear 28 splined thereon and intergeared with a gear 29 carried upon a shaft 30 which shaft, through the medium of gears 31 is driven from the power shaft 11. A clutch mechanism, of any usual and ordinary type, indicated conventionally at 32 is provided for connecting and disconnecting power from the spindle 17.

Upon the lower end of spindle 17 a cross head 33 is rigidly mounted, and is provided with a centering bit 34. As the spindle 17 is driven from the shaft 30 and advanced by the rotation of the worms 20 the centering bit bores into the top of the stump 35 and, being cylindrical, forms a bearing to prevent vibration of the cutter head, as it is further rotated. When the centering bit has bored a sufficient distance into the stump to form an adequate bearing, further feeding of the cutter head and frame 16 is discontinued by disconnecting the clutch 25 and the motion thereafter is a rotation only, of the cutter head upon, and with, the spindle 17.

The cross-head 33 carries a downwardly extending arm 36 removed radially a sufficient distance from the axis of rotation to gyrate in a path about the exterior of a stump of ordinary diameter. Slidably mounted in the depending arm 36 is a knife arm 37 constructed as a segmental rack and carrying a knife 38 at its lower extremity. The knife arm 37 slides in an arcuate guide-way in the arm 36 and is actuated by means of a feed worm 39 engaging the teeth of the rack 37. The feed worm 39 is carried upon shaft 40 journaled in bearings 41 and provided with a gear 42. The gear 42 is intergeared with a gear 43 which is carried upon shaft 44. The shaft 44 is journaled in the cross-head 33 and is provided, at the end opposite the gear 43 with a gear 45 intergearing with a gear 46 loosely, and rotatably, mounted upon the spindle 17. The gear 46 is provided, or integral, with a gear 47 engaged by a pinion 48 carried upon shaft 49. The shaft 49 is provided with gears 50 splined thereon intergeared with a gear 51 carried upon shaft 52 and driven from the power shaft 11.

The drive comprises a reversing mechanism, of any approved type exemplified in the drawing by a lever 53 controlling the sliding of the gears 50 into and out of engagement with the opposite sides of the gear 51. By the manipulation of the reverse lever 53 the shaft 49 may be driven in either direction so that, through its gearing to the knife arm 37, the said arm may be advanced, or retracted, according to the drive of shaft 49, or by disconnecting both gears 50 from the gear 51 movement of the knife arm, relative to the head, is discontinued, all of such functions being under the manual control of the operator.

The manual control of the advancing knife arm as it cuts through the woody body is necessary in view of the difference in woody structure so that the knife arm may be advanced slowly or rapidly, or advance discontinued, as the nature of the wood operated upon makes necessary or desirable.

As the cutter head is rotated and the knife arm advanced, the knife 38 will follow the dotted path indicated in Fig. 2 producing a conoidal under-cut in the stump, which progresses to an apex and severs the stump completely from its supporting roots and the lateral roots from the tap root. When the cut has been completed the knife arm may be retracted, either while the cutter head is rotating or with the cutter head brought to rest and, having been disengaged from the severed stump, the cutting device may be moved to the next stump to be severed, by the actuation of the tractor and dirigible features of the power plant.

Figure 5:
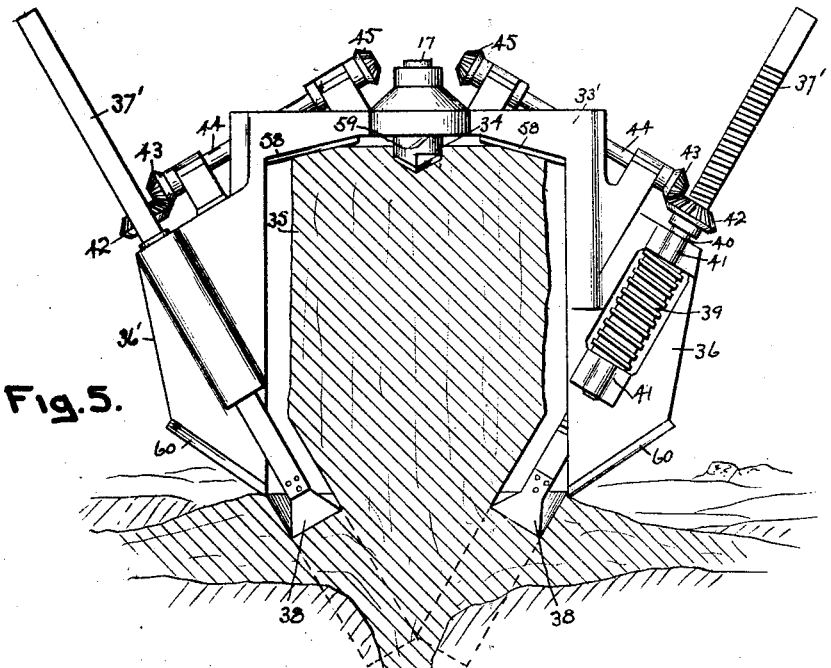
Fig. 5 is a view of a modified structure, shown in elevation, having two cutting knives, the knife arms being straight and cutting a cone as distinguished from the conoidal cut made by the device shown at Fig. 2.
Figure 6:
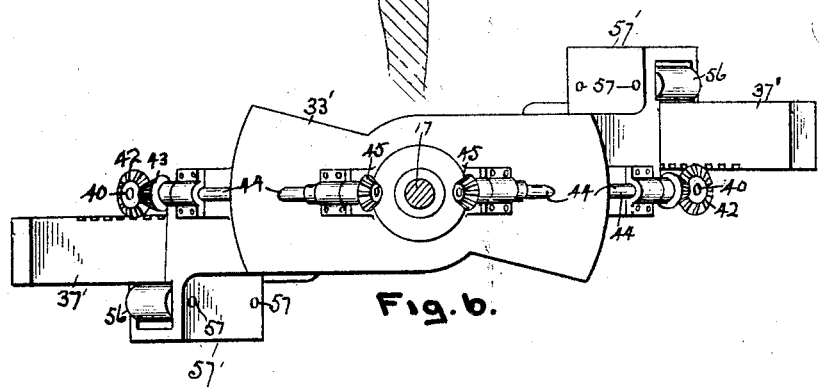
Fig. 6 is a top plan view of the cutter head of the type shown at Fig. 5.

The device as shown in Figs. 1 and 2 comprises only a single knife arm 37 but it is obvious that the number of knife arms may be increased as desired or as the nature of the work may make necessary. As shown at Figure 5 two knife arms are disclosed and are illustrated in that figure as being straight as distinguished from curvilinear as shown in Figs. 1 and 2, the straight arms being designated as 37'. In either type of knife arm, the rear of the arm, that is to say, the side opposite the rack, is preferably supported and carried upon rollers 56 journaled upon pintles 57, carried by brackets 57', the number of rollers for each arm depending upon the size of the device and the length of the arms.

As it is desirable to sever the stump and roots, to remove as much as possible from the ground, thereby making the clearing of the ground for agricultural purposes more readily accomplished, it is necessary to make the cut beginning at or near the surface of the ground. As standing stumps are of different heights, some stumps are found which are too high to permit a conoidal cut at, or below, the surface of the ground, to remove the stump mass from the earth. When such a stump is encountered, use is made of knives 58 upon the under side of cross-head 33 with auxiliary knives 59 adjacent to the centering bit 34. When such a tall stump is to be cut, the spindle 17 of the cutting head is driven and fed downwardly for a time without advancing knives 37 or 37' into cutting position whereby the centering bit 34 is not only driven into the top of the stump but, by the continued rotation and advancing of such cutter head, the knives 58 and 59 cut circularly the top of the stump, until the cutter head is thereby lowered to such a position that the cutting knife 37 is at the desired altitude. The material cut from the top of the stump by the knives 58 and 59 may be conserved in any convenient manner, if it contains desirable ingredients, as for instance turpentine or rosin. When the height of the stump has been sufficiently reduced, the advance of the cutter head is stopped and the knife advanced to produce the desired conoidal cut at the required position.

Also, on account of the irregularity of the positions of the lateral roots, the arm 36 is provided at its lower extremity with cutting edges 60 to clear a path for the rotation of the device so that it may perform its function without breakage.

We claim:

1. A stump cutter comprising a gyrating knife an arm secured to and adpated to advance the knife toward the axis of gyration, said arm being proportioned to follow into the cut effected by the knife.

2. A stump cutter comprising a gyrating knife and means to progressively decrease the radius of the gyratory path at a rate independent of the gyration.

3. A stump cutter comprising a knife, means to gyrate the knife about the situ of a stump, and means including an attached arm to cause the knife to follow a spiral path, said arm being proportioned to follow into the cut effected by the knife.

4. A stump cutter comprising a cutter head, and means to rotate the same, an arm carried by said head and disposed at an inclination to the axis of rotation, a cutter carried by the end of said arm, and means for advancing said arm longitudinally so as to cause said cutter to approach the said axis of rotation.

5. A stump cutter comprising a spindle slidably journaled on a vertical axis, a head carried by and movable with the spindle, a cutting member carried by the head, and independent means to rotate and slidably advance the head and means to advance the cutting member at an inclination to the axis of rotation independently of said spindle actuation.

6. A stump cutter comprising a spindle slidably journaled upon a vertical axis, a head carried by the spindle, a knife arm carried by the head inclined to the axis of rotation, a knife carried at the extremity of the knife arm, and means to independently rotate and slidably advance the spindle and means to advance the knife arm independently of the spindle drive.

7. A stump cutter comprising a spindle slidably journaled to rotate on a vertical axis, a head carried at the lower extremity of the spindle, a knife arm carried by the head and positioned at an inclination to the axis of rotation, and independent means to rotate and advance the cutter head and means to advance the knife arm in the path of its inclination independently of the head rotating means.

8. A stump cutter comprising a power plant, a spindle journaled upon the power plant structure adapted to be rotated and simultaneously advanced upon its axis, a cutter head carried by the spindle, means carried by the cutter head for producing a conoidal cut with the axis of the conoid coinciding with the axis of rotation and means to drive the cutter head and advance the cutting means.

9. A stump cutter comprising a power plant, a spindle mounted to be advanced and rotated from the plant, a cutter head carried by the spindle, a knife arm carried by the cutter head and disposed at an inclination to the axis of rotation, and means operable from the power plant to advance the knife arm independently of the rotation of the head.

10. A stump cutter comprising a power plant, a spindle mounted to be rotated and advanced by power from the plant, a cutter head carried by the spindle, a knife arm carried by the cutter head and disposed at an inclination to the axis of rotation and means to advance and retract the knife arm along its line of inclination independently of the rotation of the cutter head.

11. A stump cutter comprising a power plant, a spindle journaled upon the power plant and adapted to be rotated and advanced thereby, a cross-head carried by the spindle, a knife arm slidably carried by the cross-head and disposed at an inclination to the axis of rotation, means carried in part by the cross-head for advancing and retracting the knife arm and means to actuate the advancing means from the power plant independently of the rotation of the cross-head.

12. A stump cutter comprising a power plant, a spindle mounted to rotate and to be advanced by power from the plant, a centering bit carried co-axially upon the spindle, a cutter head carried upon the spindle, and a cutting member carried by the cutter head adapted to be rotated from the power about and advance toward the axis of the centering bit.

13. A stump cutter comprising a power plant, a frame slidable relative to the power plant, a spindle journaled in and adapted to move with the slidable frame, means to transmit rotatory motion from the power plant to the spindle, means actuated from the power plant for advancing and retracting the slidable frame, a cutter head carried by the spindle, a knife arm carried by the cutter head, means to move the knife arm slidably independently of the rotation of the cutter head, and means to independently connect and disconnect the transmission mechanism from the power plant to the several movable parts.

In testimony whereof we affix our signatures.

EDWIN A. McKOY.
GEORGE D. MOORE.